(12) United States Patent
Luo (10) Patent No.: US 11,797,790 B2
(45) Date of Patent: Oct. 24, 2023

(54) METHOD AND APPARATUS FOR CODE READING OF EAR TAG

(71) Applicant: QUECLINK WIRELESS SOLUTIONS CO., LTD., Shanghai (CN)

(72) Inventor: Zhijie Luo, Shanghai (CN)

(73) Assignee: QUECLINK WIRELESS SOLUTIONS CO., LTD., Shanghai (CN)

( * ) Notice: Subject to any disclaimer, the term of this patent is extended or adjusted under 35 U.S.C. 154(b) by 149 days.

(21) Appl. No.: 17/407,119

(22) Filed: Aug. 19, 2021

(65) Prior Publication Data

US 2021/0383082 A1    Dec. 9, 2021

Related U.S. Application Data

(63) Continuation of application No. PCT/CN2020/140370, filed on Dec. 28, 2020.

(30) Foreign Application Priority Data

Dec. 31, 2019   (CN) .......................... 201911414642.5

(51) Int. Cl.
*G06K 7/10*        (2006.01)
(52) U.S. Cl.
CPC ............................... *G06K 7/10366* (2013.01)
(58) Field of Classification Search
CPC .................................................. G06K 7/10366
(Continued)

(56) References Cited

U.S. PATENT DOCUMENTS 6,963,295 B1    11/2005  Greene
7,889,058 B2 *   2/2011  Suga ................... G06K 7/0008
                                                340/10.5
(Continued)

FOREIGN PATENT DOCUMENTS

CN          1475956 A       2/2004
CN          1671143 A       9/2005
(Continued)

OTHER PUBLICATIONS

International Search Report PCT/CN2020/140370.
(Continued)

*Primary Examiner* — Ahshik Kim
(74) *Attorney, Agent, or Firm* — J.C. PATENTS (57) ABSTRACT

Embodiments of the present disclosure provide a method and an apparatus for code reading of an ear tag, where a first signal from an ear tag can be acquired as an analog signal to obtain a second signal, and further the second signal that may be deformed is converted into a rectangular wave signal, fragmentation and compensation are performed on the rectangular wave signal according to a data structure, so as to obtain an accurate waveband, and after the compensated waveband is decoded and combined into target decoded data, accurate reading of the data can be realized. That is, in the embodiments of the present disclosure, even if a deformed signal is acquired, accurate target decoded data can still be restored based on conversion, fragmentation, and compensation, and in practice, comparing with a traditional way, it can be improved by about 40% in terms of distance.

19 Claims, 5 Drawing Sheets

(58) Field of Classification Search
USPC .......................................................... 235/451
See application file for complete search history.

(56) References Cited

U.S. PATENT DOCUMENTS

| | | | | |
|---|---|---|---|---|
| 2003/0151497 | A1* | 8/2003 | Cole | G06K 7/10039 340/10.34 |
| 2003/0214389 | A1 | 11/2003 | Arneson | |
| 2006/0205421 | A1* | 9/2006 | Record | H04B 7/269 455/502 |
| 2008/0018489 | A1* | 1/2008 | Kruest | G06K 7/0008 340/4.2 |
| 2012/0112884 | A1* | 5/2012 | Bae | G06K 7/10039 340/10.1 |

FOREIGN PATENT DOCUMENTS

| | | |
|---|---|---|
| CN | 101167309 A | 4/2008 |
| CN | 101620241 A | 1/2010 |
| CN | 101951034 A | 1/2011 |
| CN | 102833040 A | 12/2012 |
| CN | 103077723 A | 5/2013 |
| CN | 104853226 A | 8/2015 |
| CN | 105356065 A | 2/2016 |
| CN | 107959549 A | 4/2018 |
| CN | 111191478 A | 5/2020 |
| KR | 20140060931 A | 5/2014 |
| KR | 101686969 B1 | 12/2016 |

OTHER PUBLICATIONS

The first Office Action of CN2019114146425.
Notice of Allowance of CN2019114146425.
Extended European Search Report of the parallel application EP20910214.4.
"Radio Frequency Identification of Animals-Technical Concept", International Standard ISO/IEC, vol. 11785, No. 1st Edition, Oct. 15, 1996, pp. 1-13.

* cited by examiner

METHOD AND APPARATUS FOR CODE READING OF EAR TAG

CROSS-REFERENCE TO RELATED APPLICATIONS

This application is a continuation of International Application No. PCT/CN2020/140370, filed on Dec. 28, 2020, which claims priority to Chinese Patent Application No. 201911414642.5, filed on Dec. 31, 2019, both of the applications are hereby incorporated by reference in their entireties.

TECHNICAL FIELD

The present disclosure relates to the field of communication technologies and, in particular, to a method and an apparatus for code reading of an ear tag.

BACKGROUND

Radio frequency identification (RFID) technology has been widely used in a management system for animal breeding or slaughtering. Exemplarily, RFID tags can be placed on ears of livestock for individual binding, therefore, such RFID tags are also known as ear tags. A code in an ear tag can be used as an identification of an animal, and the reader can read the content of the tag, and run through epidemic prevention, sterilization, quarantine, and supervision work of livestock from birth to slaughter by taking a unique number of the tag as the core, thereby achieving effective monitoring of product quality and safety as well as timely tracking and tracing of a source and flow of problem products, standardizing a production and operation process of meat food enterprises, and effectively improving the quality and safety of meat products.

In prior art, the reader reads a signal in the ear tag by using the following three steps: signal capturing, in which the signal from the ear tag is identified as a digital signal and a timer is used for real-time capturing to obtain a duration of each rectangular pulse; waveform decoding, in which corresponding bits are decomposed according to the durations of the rectangular waves of the digital signal, and finally organized and integrated into valid digital information according to a data structure of the signal; checking, in which the extracted data information is checked according to a certain rule, and if the checking is successful, the data information is determined to be valid.

However, in the prior art, if the reader is far away from the ear tag, for example, if the reader is more than 17 cm away from the ear tag, a phenomenon of misreading or unreadable often occurs, in this case, a user must get closer to the animal to read the tag, which is not conducive for manipulation.

SUMMARY

Embodiments of the present disclosure provide a method and an apparatus for code reading of an ear tag, to solve the technical problem that the reader cannot read the ear tag remotely.

A first aspect of the embodiments of the present disclosure provides a method for code reading of an ear tag, including:
acquiring a first signal from the ear tag according to an acquisition mode of an analog signal to obtain a second signal;
converting the second signal into a rectangular wave signal;
performing fragmentation and compensation on the rectangular wave signal to obtain multiple pieces of fragmented data, according to a data structure of the first signal and a time difference between adjacent falling edges and rising edges in the rectangular wave signal; and
decoding the multiple pieces of fragmented data respectively, and determining target decoded data of the first signal according to the decoded data, where the target decoded data is obtained from combination in accordance with the data structure of the first signal.

In an embodiment, the converting the second signal into a rectangular wave signal includes:
performing a differential operation on the second signal to obtain peaks and valleys in the second signal;
segmenting the second signal according to the peaks and the valleys; and
performing a logic conversion on a segmented waveform to obtain the rectangular wave signal.

In an embodiment, with respect to the segmenting of the second signal according to the peaks and the valleys, a segmenting point is a midpoint of adjacent peak and valley; and
the performing a logical conversion on a segmented waveform includes:
converting a waveband including the peak to a high level, and converting a waveband including the valley to a low level.

In an embodiment, the performing fragmentation and compensation on the rectangular wave signal to obtain multiple pieces of fragmented data, according to a data structure of the first signal and a time difference between adjacent falling edges and rising edges in the rectangular wave signal include:
cropping or adding to the rectangular wave signal to obtain multiple pieces of grouped data, according to the data structure of the first signal and the time difference between the adjacent falling edges and rising edges in the rectangular wave signal; and
adjusting the time difference between the adjacent falling edges and rising edges in the respective grouped data to a preset value that matches the time difference to obtain the multiple pieces of fragmented data.

In an embodiment, the determining target decoded data of the first signal according to the decoded data includes:
combining the decoded data to obtain first decoded data, according to the data structure of the first signal;
checking the first decoded data; and
determining the first decoded data as the target decoded data of the first signal if the checking is passed.

A second aspect of the embodiment of the present disclosure provides an ear tag code reading apparatus, including:
an acquiring module, configured to acquire a first signal from the ear tag according to an acquisition mode of an analog signal to obtain a second signal;
a converting module, configured to convert the second signal into a rectangular wave signal;
a processing module, configured to perform fragmentation and compensation on the rectangular wave signal to obtain multiple pieces of fragmented data, according to a data structure of the first signal and a time difference between adjacent falling edges and rising edges in the rectangular wave signal; and
a decoding module, configured to decode the multiple pieces of fragmented data respectively, and determine target decoded data of the first signal according to the decoded data, where the target decoded data is obtained from combination in accordance with the data structure of the first signal.

In an embodiment, the converting module is specifically configured to:

perform a differential operation on the second signal to obtain peaks and valleys in the second signal;

segment the second signal according to the peaks and the valleys; and perform a logic conversion on a segmented waveform to obtain the rectangular wave signal.

In an embodiment, with respect to the segmenting of the second signal according to the peaks and the valleys, a segmenting point is a midpoint of adjacent peak and valley; and the converting module is further configured to:

convert a waveband including the peak to a high level, and convert a waveband including the valley to a low level.

In an embodiment, the processing module is specifically configured to:

crop or add to the rectangular wave signal to obtain multiple pieces of grouped data, according to the data structure of the first signal and the time difference between the adjacent falling edges and rising edges in the rectangular wave signal; and adjust the time difference between the adjacent falling edges and rising edges in the respective grouped data to a preset value that matches the time difference to obtain the multiple pieces of fragmented data.

In an embodiment, the decoding module is specifically configured to:

combine the decoded data to obtain first decoded data, according to the data structure of the first signal;

check the first decoded data; and determine the first decoded data as target decoded data of the first signal if the checking is passed.

A third aspect of the embodiment of the present disclosure provides an electronic device, which includes: a processor, a memory, and a computer program; where the computer program is stored in the memory and is configured to be executed by the processor, and the computer program includes instructions for executing the method as described in any one of the preceding first aspect.

A fourth aspect of the embodiment of the present disclosure provides a computer-readable storage medium, where the computer-readable storage medium stores a computer program, and when the computer program is executed, the method as described in any one of the preceding first aspect is implemented.

The beneficial effects of the embodiments of the present disclosure relative to the prior art are:

according to the embodiments of the present disclosure, a method and an apparatus for code reading of an ear tag are provided. It is found that when a reader is far away from the ear tag, the reason why the content of the ear tag cannot be accurately read is that when the distance is far, a signal in the ear tag acquired by the reader is greatly deformed, and the decoding of the deformed signal is prone to errors or failure in decoding. Therefore, in the embodiments of the present disclosure, a first signal from an ear tag can be acquired as an analog signal to obtain a second signal, and further the second signal that may be deformed is converted into a rectangular wave signal, fragmentation and compensation are performed on the rectangular wave signal according to a data structure, so as to obtain an accurate waveband, and after the compensated waveband is decoded and combined into target decoded data, accurate reading of the data can be realized. That is, in the embodiments of the present disclosure, even if a deformed signal is acquired, accurate target decoded data can still be restored based on conversion, fragmentation, and compensation, and in practice, comparing with a traditional way, it can be improved by about 40% in terms of distance.

DESCRIPTION OF EMBODIMENTS

Embodiments of the present disclosure will be described in more detail below with reference to the accompanying drawings. Obviously, the embodiments described are only a part of the embodiments of the present disclosure, but not all of them. Based on the embodiments in the present disclosure, all other embodiments obtained by those skilled in the field without paying creative labor fall within the scope of protection of the present disclosure.

Exemplary embodiments will be described herein in detail, examples of which are shown in the accompanying drawings. When the following description refers to the accompanying drawings, the same numbers in different accompanying drawings indicate the same or similar elements unless otherwise indicated. The embodiments described in the following exemplary embodiments do not represent all embodiments consistent with the present disclosure. On the contrary, they are merely examples of apparatus and methods consistent with some aspects of the present disclosure as detailed in the appended claims.

It should be clear that the embodiments described are only a part of the embodiments of the present disclosure, but not all of them. Based on the embodiments in the present disclosure, all other embodiments obtained by those skilled in the field without paying creative labor fall within the scope of protection of the present disclosure.

The term used in embodiments of the present disclosure is intended solely for the purpose of describing a particular embodiment and is not intended to limit the present disclosure. The singular forms of "a", "an" and "the" as used in the embodiments of the present disclosure and the appended claims are also intended to include plural forms, unless the context clearly indicates other meanings.

It should be understood that the term "and/or" used herein is only a description of an association relationship of associated objects, indicating that three relationships can exist, for example, A and/or B, which can indicate the following three cases: A exists alone, both A and B exist, and B exists alone. In addition, the character "/" in the context generally indicates that the associated objects before and after are in an "or" relationship.

It should be understood that the terms "first", "second", "third", "fourth", etc., in the specification and claims of the present disclosure and the accompanying drawings above are used to distinguish similar objects, if present, and need not be used to describe a particular order or sequence.

Depending on the context, for example, the word "if" used here can be interpreted as "when" or "in response to determining" or "in response to detecting". Similarly, depending on the context, the phrases "if determined" or "if detected (a stated condition or event)" can be interpreted as "when determined" or "in response to determining" or "when detecting (a stated condition or event)" or "in response to detecting (a stated condition or event)".

It should also be noted that the terms "include", "include" or any other variants thereof are intended to cover non-exclusive inclusion, so that a commodity or system that includes a series of elements not only includes those elements, but also those elements that are not explicitly listed, or elements that are inherent to such good or system. Without further limitation, the element defined by the statement "includes a . . . " does not exclude the existence of other identical elements in the commodity or system that includes the element.

Figure 1:
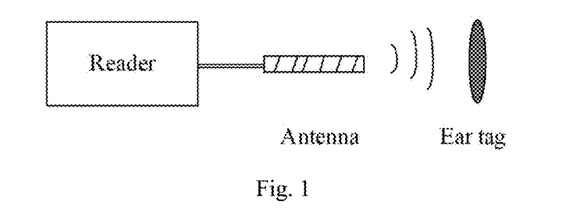
FIG. 1 is a schematic diagram of a system to which a method for code reading of an ear tag provided by an embodiment of the present disclosure is applied.

FIG. 1 is a schematic structural diagram of a system to which the method of the embodiment of the present disclosure is applied. As shown in FIG. 1, the system can include: an ear tag (Tag), a reader (Reader) and an antenna (Antenna).

Among them, the ear tag (also called an RFID tag) can be composed of coupling components and chips, the ear tag contains a built-in antenna, and each tag has a unique electronic code inside to identify a target object, after entering a scanning field of the reader, the tag receives a radio frequency signal sent by the reader through the antenna, sends the electronic code stored in the chip by virtue of energy obtained from an induced current.

The reader is an apparatus for reading ear tag information.

The antenna is connected to the reader and is used to deliver radio frequency signals between the ear tag and the reader.

The method for code reading of an ear tag in the embodiment of the present disclosure can be applied to a reader, the reader can include an antenna, and the reader can communicate with the ear tag.

Specifically, the reader sends a radio frequency signal of a certain frequency through a transmitting antenna, and when the ear tag enters a working area of the transmitting antenna, an induced current is generated, the ear tag gains energy and is activated; the ear tag transmits its own code and other information through a built-in transmitting antenna; a receiving antenna of a main control system (which can be used to coordinate communications between the ear tag and the reader, not shown in FIG. 1) receives a carrier signal sent from the ear tag, and transmits the same to the reader via an antenna regulator. The received signal is demodulated, decoded and checked by the reader, and is then sent to the main control system for related service processing. For example, the main control system determines the legality of the ear tag according to specific logical operations, makes corresponding processing and control for different settings, and sends a command signal to control an action of an actuator.

In specific applications, RFID tags suitable for animal identification can be divided into full duplex (FDX) mode, half duplex (HDX) mode, sequential (SEQ) mode and other types, based on their coupling manners (inductive-electromagnetic), communication processes, data transmission methods from ear tags to readers (load modulation, backscatter, high-order harmonics), frequency ranges and the like.

The International Standards Organization (ISO) 11784 and ISO 11785 respectively stipulate a code structure and technical guidelines for animal identification. The standard does not specify a size of a transponder, so various forms suitable for animals involved can be designed, such as glass tubes, ear tags or collars. When entering an electromagnetic field transmitted by the RFID reader, the ear tag extracts energy from the magnetic field and will begin to transmit its data.

The ear tag in the embodiment of the present disclosure can be an electronic ear tag of an FDX-B type.

According to stipulations in ISO 11785, an FDX-B electronic ear tag adopts a differential binary phase (DBP) encoding scheme, the clock is fixed as fc=134.2 kHz, and a data bit rate used is fc/32, that is, each bit occupies 32 clock periods, as shown in the following formula:

$$T=1/(fc/32)=1(134200/32)=1/4.19375=238.45 \text{ us}$$

Where T can represent the data bit rate, and fc can represent the clock period.

Figure 2:
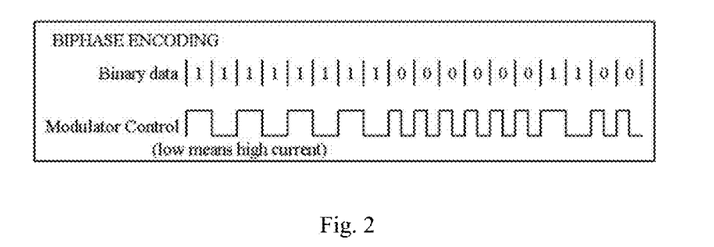
FIG. 2 is a schematic diagram of FDX-B encoding.

Exemplarily, as shown in FIG. 2, any edge of the differential binary phase encoding in a half bit period represents a binary "0", while no edge represents a binary "1". In addition, at the beginning of each bit period, the level needs to be inverted, that is, the binary bit "0" is represented by two narrow rectangular waves with a period of 119.225 us, and the binary bit "1" is represented by a wide rectangular wave with a period of 238.45 us.

Figure 3:
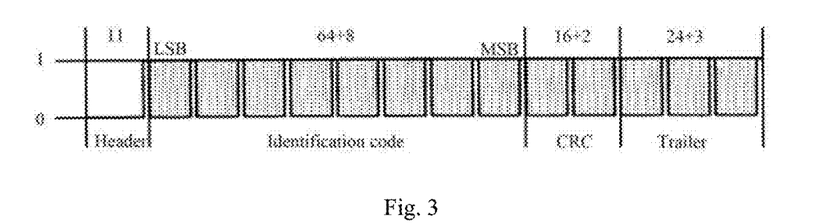
FIG. 3 is a schematic diagram of a data structure of an FDX-B protocol.

FIG. 3 shows a data structure of an FDX-B protocol. As shown in FIG. 3, the data structure of the FDX-B protocol has a total of 128 bits of data. A data field contains:
   an 11-bit synchronization information field, fixed as 10000000000, and the transmission starts with the least significant bit; a 64-bit identification code with 8 control bits; a 16-bit cyclic redundancy check (CRC) code with 2 control bits; a 24 extended data bits with 3 control bits.

When the ear tag enters the electromagnetic field transmitted by the RFID reader, the ear tag absorbs energy from the magnetic field and will first transmit an 11-bit synchronization information header with the least significant bit (LSB) to indicate the beginning of the data block, then the 64-bit (8-byte) identification code. After every 8 bits are sent, a control bit is inserted to distinguish the data from the synchronization information sequence. A 16-bit (2 bytes) CRC check code, similarly, after every 8 bits are sent, a control bit is inserted to distinguish the data from the synchronization information header. Finally, there are 24 bits (3 bytes) of extended data bits and 3 extended bits.

It should be noted that in specific applications, in addition to the synchronization information header, for every 8 bits (1 byte), it is possible to insert a control bit which is fixed as logic "1".

A read-write distance is a very critical parameter for an RFID system. Therefore, it is of great significance to find a way to increase its read-write distance. The factors that affect the read-write distance of an ear tag include an operating frequency of the antenna, RF output power of the reader, a receiving sensitivity of the reader, power consumption of the ear tag, Q value of the antenna and a resonant circuit, a direction of the antenna, and a coupling degree of the reader and the ear tag, as well as hardware-related factors such as energy obtained by the ear tag itself and energy for sending information. For FDX-B type ear tags, if it is necessary to increase a reading distance of the reader, in addition to adjusting the hardware parameters, software acquisition and related algorithm strategies also play a vital role.

Figure 4:
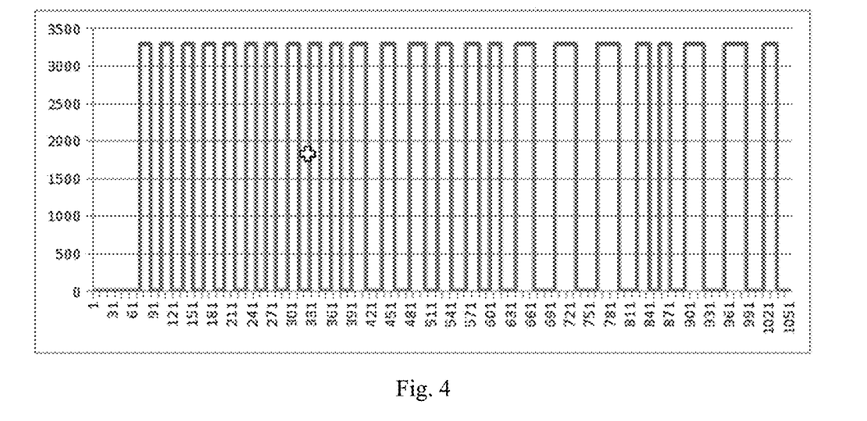
FIG. 4 is a schematic diagram of a theoretical waveform of a signal of an ear tag in the prior art.

Generally, as shown in FIG. 4, a theoretical waveform of FDX-B should be a regular rectangular wave signal, either period or amplitude of which is close to a complete rectangular pulse signal.

For digital signals, take a 3.3V transistor-transistor logic (TTL) integrated circuit as an example, when the input voltage signal is above 2.0V, the integrated circuit detects a high level; when the input voltage information is below 0.8V, the integrated circuit detects a low level.

A traditional device takes a received FDX-B signal as a digital signal, and uses a micro controller unit (MCU) to measure durations of high and low levels for decoding. That is, if the MCU detects a jump between a high level and a low level (such as switching from a high level to a low level or switching from a low level to a high level) within a 1-bit time period of 238.45 us, then it is determined that a logic "0" information has been received; otherwise, if the level is no change within a continuous time period of 238.45 us, then it is determined that a logic "1" has been received.

As shown in the first half of FIG. 4, information of 20 consecutive narrow rectangular waves plus 1 wide rectangular waves can be observed, which represents an FDX-B synchronization information header "100000000000", since an actual signal is transmitted with the least significant bit, a sequence of transmission which is opposite to a sequence of the data structure is thus "00000000001". There are a total of 128 bits starting from the synchronization information header, after the 128-bit data is received, the MCU will check the data according to a received CRC check code, only when the checking passes, it is determined that the data of the complete data has been obtained, and then the data will be processed.

However, the solution has certain limitations and is only suitable for situations where the ear tag is close to the reader. Because when the ear tag is far away from the reader, the amplitude of the waveform will be deformed to a certain extent, and the phase of the signal will also be shifted, it is difficult for the MCU to perform identification according to the digital information in this situation.

Figure 5:
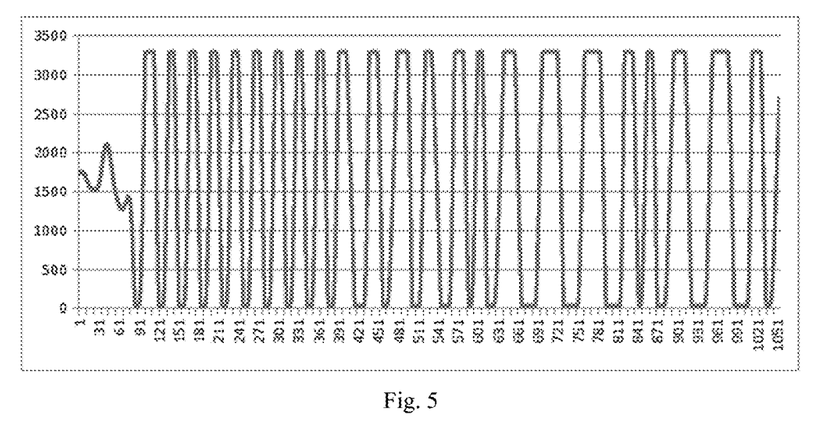
FIG. 5 is a schematic diagram of a waveform measured when an ear tag is 5 cm away from a reader in the prior art.
Figure 6:
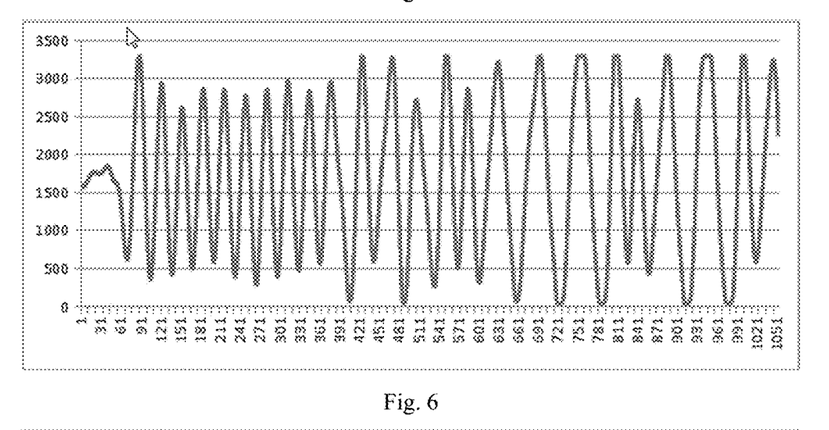
FIG. 6 is a schematic diagram of a waveform measured when an ear tag is 17 cm away from a reader in the prior art.
Figure 7:
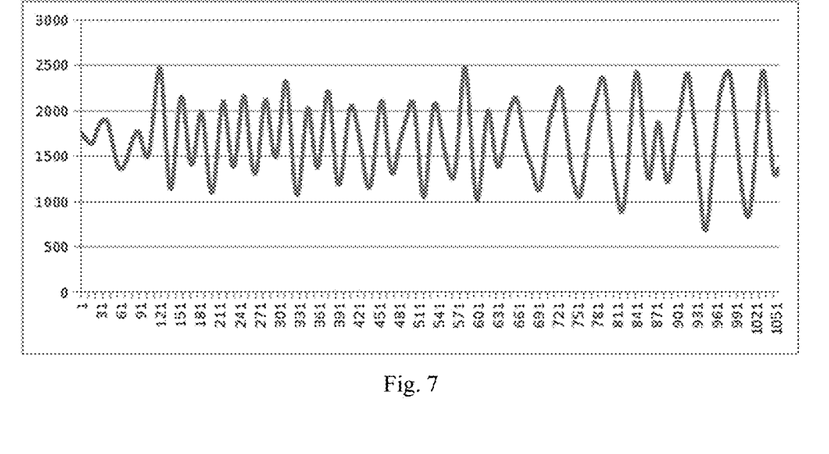
FIG. 7 is a schematic diagram of a waveform measured when an ear tag is 20 cm away from a reader in the prior art.

Exemplary, FIG. 5 to FIG. 7 illustrate differences among actually acquired waveforms of signals received by an FDX-B receiver between the same ear tag and the same reader at different distances. FIG. 5 can be a schematic diagram of a waveform measured when the ear tag is 5 cm away from the reader, FIG. 6 can be a schematic diagram of a waveform measured when the ear tag is 17 cm away from the reader, and FIG. 7 can be a schematic diagram of a waveform measured when the ear tag is 20 cm away from the reader.

As can be seen, the signal period and amplitude of the waveform when the ear tag is 5 cm away from the reader are very close to an ideal waveform. For the case where the ear tag is 17 cm away from the reader, the MCU can still identify and decode the waveform regardless of the period or amplitude of the waveform, but there is a certain probability of a decoding failure. When the ear tag is 20 cm away from the reader, most of the waveforms are completely distorted; the MCU can no longer perform the decoding using general methods.

As can be seen from the above, when the reader is far away from the ear tag, the reason why the content of the ear tag cannot be accurately read is that when the distance is far, a signal in the ear tag acquired by the reader is greatly deformed, and the decoding of the deformed signal is prone to errors or failure in decoding. Based on this, the embodiments of the present disclosure provide a method and an apparatus for code reading of an ear tag, where a first signal from an ear tag can be acquired as an analog signal to obtain a second signal, and further the second signal that may be deformed is converted into a rectangular wave signal, fragmentation and compensation are performed on the rectangular wave signal according to a data structure, so as to obtain an accurate waveband, and after the compensated waveband is decoded and combined into target decoded data, accurate reading of the data can be realized. That is, in the embodiments of the present disclosure, even if a deformed signal is acquired, accurate target decoded data can still be restored based on conversion, fragmentation, and compensation, and in practice, comparing with a traditional way, it can be improved by about 40% in terms of distance.

In the following, some embodiments of the present disclosure will be described in detail with reference to the accompanying drawings. In the case of no conflict, the following embodiments and features in the embodiments can be combined with each other.

Figure 8:
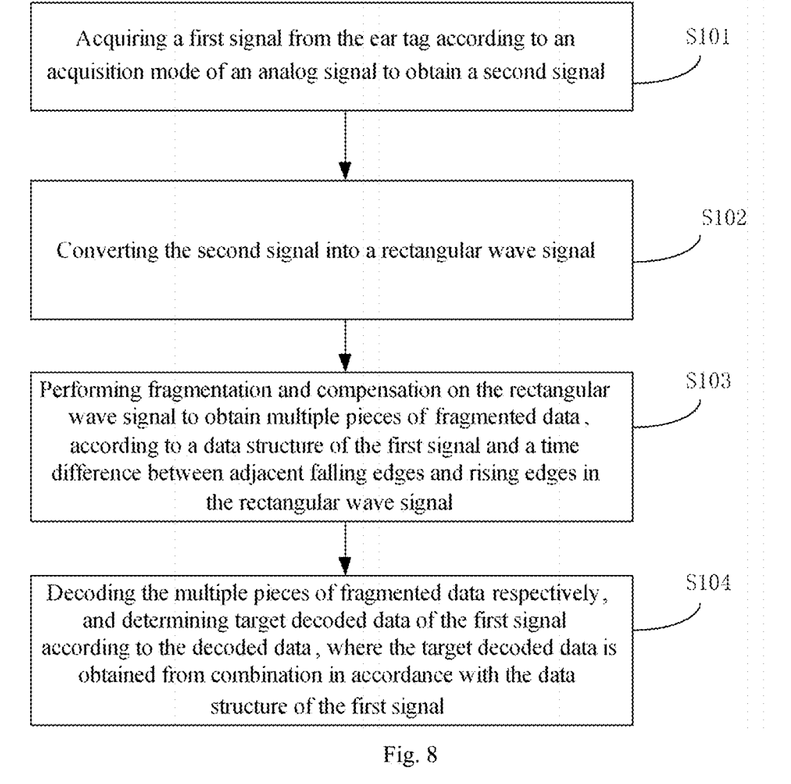
FIG. 8 is a schematic flowchart of a method for code reading of an ear tag provided by an embodiment of the present disclosure.

As shown in FIG. 8, FIG. 8 is a schematic flowchart of a method for code reading of an ear tag provided by an embodiment of the present disclosure. The method can specifically include:

S101: acquiring a first signal from the ear tag according to an acquisition mode of an analog signal to obtain a second signal.

In the embodiment of the present disclosure, the first signal of the ear tag can be an FDX-B signal. Considering that the FDX-B signal may be deformed, it is regarded as an analog signal, and a reader can use an analog-to-digital converter (ADC) to acquire the FDX-B signal, and waveform information of the acquired second signal can be stored in a memory.

Exemplarily, after sending a radio frequency signal through an antenna, the reader waits for a period (a specific value of this period can be determined according to actual applications), and the ear tag returns data information. An MCU starts internal ADC acquisition and stores it in a random access memory (RAM) in real time. For example, according to the Nyquist sampling theorem, the sampling frequency is at least twice the signal frequency to ensure that the digital signal after sampling completely retains information of the original signal. Therefore, a sampling period of the ADC in the embodiment of the present disclosure can be as same as the frequency of a radio frequency signal, which is 134.2 kHz, and a data bit rate is always fc/32, so an acquisition of 1 bit requires 32 ADC sampling periods.

S102: converting the second signal into a rectangular wave signal.

In the embodiment of the present disclosure, an irregular and deformed second signal can be converted into a regular rectangular wave signal according to a certain algorithm.

Figure 9:
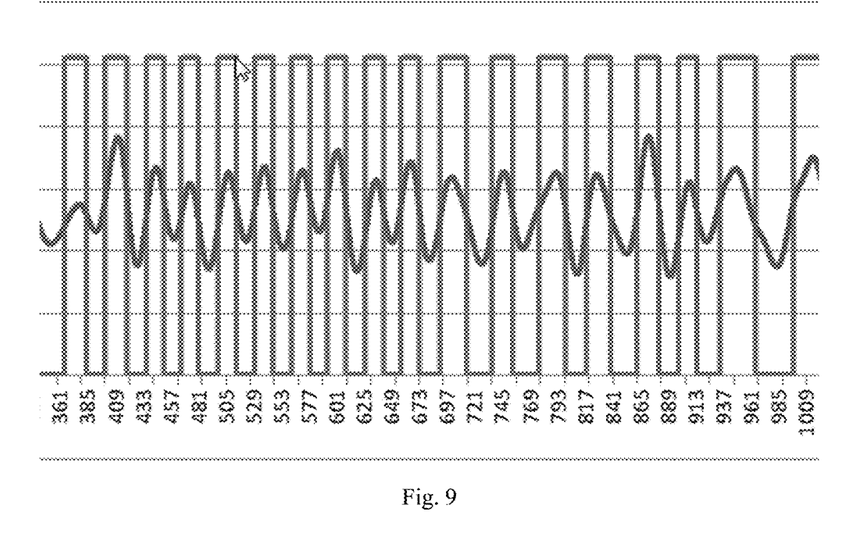
FIG. 9 is a schematic diagram of comparison between a waveform of a signal acquired from ADC and a rectangular wave signal obtained from transformation according to an embodiment of the present disclosure.

Exemplarily, FIG. 9 shows a schematic diagram of comparison between a waveform of a second signal acquired from ADC and a rectangular wave signal obtained from transformation, where the curve part is a waveform of the second signal acquired from ADC, and the rectangular wave signal is a standard regular rectangular waveform.

In an embodiment, the converting the second signal into a rectangular wave signal includes: performing a differential operation on the second signal to obtain peaks and valleys in the second signal; segmenting the second signal according to the peaks and the valleys; and performing a logic conversion on a segmented waveform to obtain the rectangular wave signal.

In the embodiment of the present disclosure, a differential operation can be performed on the second signal to find out points with a slope of 0, and these points correspond to peaks or valleys of the waveform. After obtaining the peaks or valleys, the waveform is segmented. Finally, a logic conversion is performed on the segmented waveform to obtain a rectangular wave signal.

In an embodiment, with respect to the segmenting of the second signal according to the peaks and the valleys, a segmenting point is a midpoint of adjacent peak and valley.

In an embodiment, the performing a logical conversion on a segmented waveform includes: converting a waveband including the peak to a high level, and converting a waveband including the valley to a low level.

Figure 10:
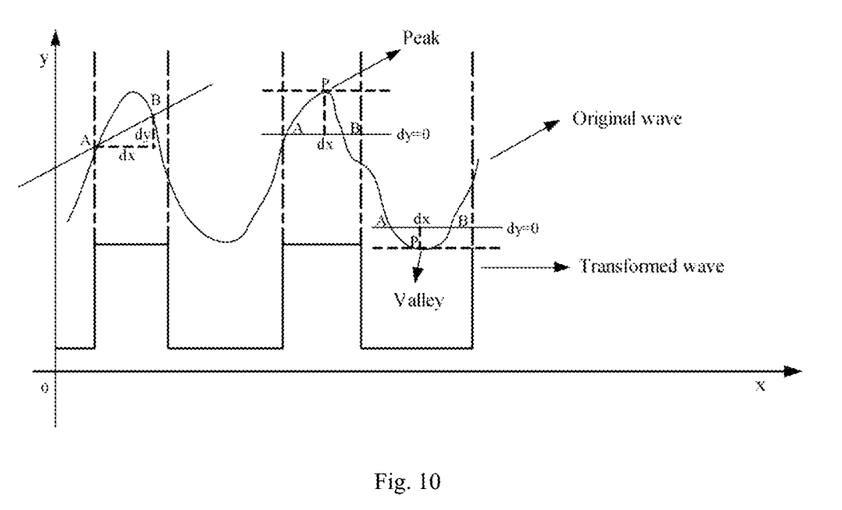
FIG. 10 is a schematic diagram of a waveform transformation principle provided by an embodiment of the present disclosure.

Exemplarily, FIG. 10 shows a schematic diagram of a waveform transformation principle of a second signal. It should be noted that an original waveform of the second signal actually acquired may be discrete rather than continuous. The embodiment of the disclosure is illustrated by virtue of a continuous original waveform for the purpose of explaining the principle.

As shown in FIG. 10, a series of waveform signal points obtained by sampling is first abstracted into a set of one-dimensional vectors, for example, to obtain:

$$S=[v_1, v_2, \ldots v_n]$$

After that, a difference vector of S is obtained by traversing and computing:

$$D_i = S_{(i+dx)} - S_{(i)}, i \in 1, 2, \ldots, n-dx-1$$

Where dx is taken according to an ADC sampling period and corresponds to a distance between two points in the vector S. For 1 bit that requires 32 periods, dx=10, and a point where a value of an element in the differential vector is 0 corresponds to a peak/valley value of the waveform.

Taking the waveform in FIG. 10 as a column, points A and B in FIG. 10 correspond to S(i), S(i+dx), respectively. The difference value for the point A and the point B is as follows:

$$dy = S_B - S_A$$

When dy=0, i.e., when the AB line segment is perfectly parallel to the horizontal coordinates, the extreme point is located at the central point of A and B. Next, whether the extreme point is a peak or a valley can be determined by symbols of two sides of the extreme point in the difference vector. When the left side of the extreme point is positive and the right side is negative, the extreme point is a peak; when the left side of the extreme point is negative and the right side is positive, the extreme point is a valley.

S103: performing fragmentation and compensation on the rectangular wave signal to obtain multiple pieces of fragmented data, according to a data structure of the first signal and a time difference between adjacent falling edges and rising edges in the rectangular wave signal.

In the embodiment of the present disclosure, a data structure of the signal of the ear tag can be of a FDX-B data structure, which will not be repeated here.

Specifically, a synchronization information header can be searched first, and then according to byte alignment of the FDX-B data structure, the rectangular wave signal is segmented into multiple small wavebands according to a time length. For example, the waveform can be cut by taking 8 bits plus 1 control bit (with a total time of 238.45*9 us) as a whole. During this process, if any data fragments are found to be insufficient or too long, subsequent compensation or cropping will be carried out accordingly.

In an embodiment, the performing fragmentation and compensation on the rectangular wave signal to obtain multiple pieces of fragmented data, according to a data structure of the first signal and a time difference between adjacent falling edges and rising edges in the rectangular wave signal includes: cropping or adding to the rectangular wave signal to obtain multiple pieces of grouped data, according to the data structure of the first signal and the time difference between the adjacent falling edges and rising edges in the rectangular wave signal; and adjusting the time difference between the adjacent falling edges and rising edges in the respective grouped data to a preset value that matches the time difference to obtain the multiple pieces of fragmented data.

Figure 11:
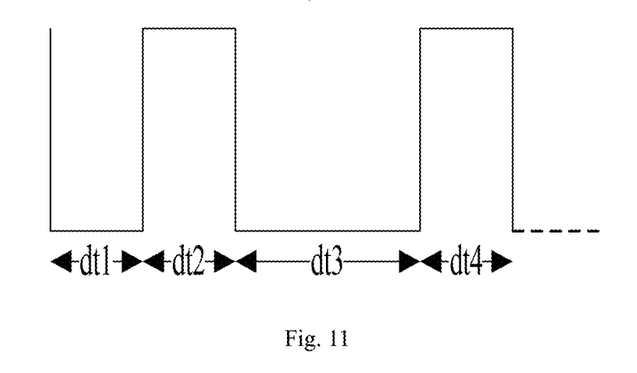
FIG. 11 is a schematic diagram of an edge measurement principle provided by an embodiment of the present disclosure.

Exemplarily, time measurement can be performed on the shaped rectangular wave signal to prepare for data fragmentation. As shown in FIG. 11, two adjacent edges in the rectangular wave signal can be measured and their time difference can be obtained.

Figure 12:
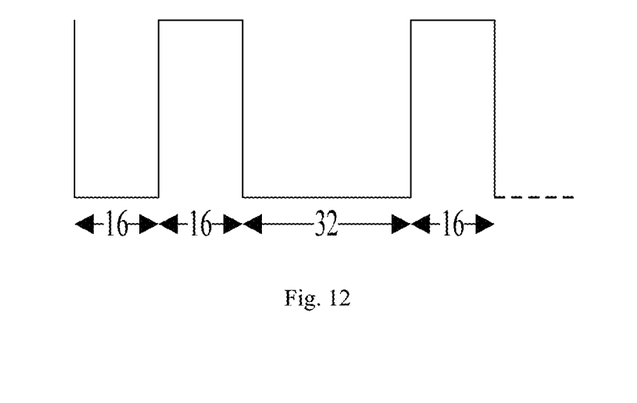
FIG. 12 is a schematic diagram of another edge measurement principle provided by an embodiment of the present disclosure.

Since the ADC sampling frequency is 134.2 kHz, as shown in FIG. 12, ideally, each bit occupies 32 ADC sampling periods (bit 0 is two pieces of 16-period data, bit 1 is 32-period data). However, the waveforms actually acquired can be deformed to a certain degree, and the time of some bits will deviate from the 32 ADC sampling periods. Table 1 shows some of the actual measured data.

TABLE 1

| 17 | 19 | 27 | 18 | 20 | 23 | 20 | 19 | 14 | 16 | 31 | 34 | 31 | 31 | 34 | 29 |
| 21 | 16 | 11 | 20 | 32 | 28 | 34 | 29 | 21 | 23 | 22 | 17 | 20 | 28 | 33 | 31 |
| 33 | 29 | 35 | 27 | 33 | 20 | 17 | 27 | 33 | 20 | 21 | 25 | 33 | 27 | 19 | 22 |

According to the FDX-B data structure, there is 1 control bit for every 8 bits, that is, these 9 bits can be regarded as a set of complete data. Since each bit is 32 ADC periods, the sum of 1 set of data containing 9 bits should be 288 ADC periods.

Therefore, when grouping the rectangular wave signal for distribution, the sum of the actual measured data can be calculated in order, and whenever the sum of the accumulated data is a value close to 288, for example, the absolute value of the difference with 288 is less than 16 or the like, one piece of grouped data can be obtained, and is cropped or compensated as 288 according to the sum of the grouped data, and the value of the cropping or compensation is accumulated into latter grouping until the grouping of all data is completed.

That is, when a group of grouped data is found to be less than 288 or greater than 288, it will carry or borrow from the adjacent grouped data, until the sums of all grouped data are 288.

Exemplarily, taking the data shown in Table 1 as an example, the first grouping corresponding to Table 2 can be obtained.

TABLE 2

| 17 | 19 | 27 | 18 | 20 | 23 | 20 | 19 | 14 | 16 | 31 | 34 | 31 |
|----|----|----|----|----|----|----|----|----|----|----|----|----|

The data sum of this group is 289, which is 1 more than 288, and needs to be cropped by subtracting 1 from the end of the data piece, and the data after cropping is Group one, as shown in Table 3.

TABLE 3

| 17 | 19 | 27 | 18 | 20 | 23 | 20 | 19 | 14 | 16 | 31 | 34 | 30 |
|----|----|----|----|----|----|----|----|----|----|----|----|----|

The cropped values in Group one will be combined into Group two, as shown in Table 4, the value in the first entry of Group two is increased by 1 unit. At this time, the cumulative sum of the second group of data is 286, which is 2 units less than 288, so it needs to borrow 2 units of data from the third group of data.

TABLE 4

| 32 | 34 | 29 | 21 | 16 | 11 | 20 | 32 | 28 | 34 | 31 |
|----|----|----|----|----|----|----|----|----|----|----|

After repeating the above steps, the original data fragments were adjusted as shown in Table 5.

TABLE 5

| 17 | 19 | 27 | 18 | 20 | 23 | 20 | 19 | 14 | 16 | 31 | 34 | 30 | 32 | 34 | 29 |
|----|----|----|----|----|----|----|----|----|----|----|----|----|----|----|----|
| 21 | 16 | 11 | 20 | 32 | 28 | 34 | 31 | 19 | 23 | 22 | 17 | 20 | 28 | 33 | 31 |
| 33 | 29 | 33 | 28 | 33 | 20 | 17 | 27 | 33 | 20 | 21 | 25 | 33 | 31 | 15 | 22 |

After compensation is done among groups, the condition of 288 complete periods is satisfied, but each bit is not strictly 32 periods, and the next step of compensation processing needs to be executed before decoding to convert to an integer multiple of 32.

Exemplarily, for Group one shown in Table 3, the process of adjusting each data to a preset value matching the data can be as shown in Table 6:

TABLE 6

| 17     | 19     |        |         |         |         |        |    |        |    |    |    |    |
|--------|--------|--------|---------|---------|---------|--------|----|--------|----|----|----|----|
| 16 + 1 | 16 + 3 | 27     |         |         |         |        |    |        |    |    |    |    |
| 16     | 16     | 27 + 4 | 18      |         |         |        |    |        |    |    |    |    |
| 16     | 16     | 32 − 1 | 16 + 2  | 20      |         |        |    |        |    |    |    |    |
| 16     | 16     | 32     | 16 + 1  | 16 + 4  | 23      |        |    |        |    |    |    |    |
| 16     | 16     | 32     | 16      | 16      | 28      | 20     |    |        |    |    |    |    |
| 16     | 16     | 32     | 16      | 16      | 32 − 4  | 16 + 4 | 19 |        |    |    |    |    |
| 16     | 16     | 32     | 16      | 16      | 32      | 16     | 19 |        |    |    |    |    |
| 16     | 16     | 32     | 16      | 16      | 32      | 16     | 16 + 3 | 14 |    |    |    |    |
| 16     | 16     | 32     | 16      | 16      | 32      | 16     | 16 + 3 | 16 − 2 | 16 |    |    |    |
| 16     | 16     | 32     | 16      | 16      | 32      | 16     | 16 | 16 + 1 | 31 |    |    |    |
| 16     | 16     | 32     | 16      | 16      | 32      | 16     | 16 | 16     | 31 + 1 | 34 |    |    |
| 16     | 16     | 32     | 16      | 16      | 32      | 16     | 16 | 16     | 32 | 32 + 2 | 30 |    |
| 16     | 16     | 32     | 16      | 16      | 32      | 16     | 16 | 16     | 32 | 32     | 32 |    |

Hence, each data in Group one is adjusted to 16 or 32 to obtain the fragmented data corresponding to Group one.

S104: decoding the multiple pieces of fragmented data respectively, and determining target decoded data of the first signal according to the decoded data, where the target decoded data is obtained from combination in accordance with the data structure of the first signal.

In the embodiment of the disclosure, decoding can be performed according to the timing sequence specified by FDX-B. Exemplarily, the decoding of the fragmented data corresponding to Group one (i.e., the last row of Table 6), for example, can be performed according to the correspondence in Table 7.

TABLE 7

| 16 | 16 | 32 | 16 | 16 | 32 | 16 | 16 | 16 | 16 | 32 | 32 |
|----|----|----|----|----|----|----|----|----|----|----|----|
| 0  |    | 1  |    | 0  | 1  | 0  |    | 0  |    | 1  | 1  |

Exemplarily, each data can be scanned sequentially from left to right: when two consecutive values of 16 are detected, it is recognized as a bit "0", and when one value of 32 is detected, it is recognized as a bit "1". According to Table 7, 01010011 is obtained, because the data is transmitted from the least significant bit, so the actual value is 11001010, remove 1 control bit, and combine 8 bits into one complete byte as 0xCA.

Further, the decoded data can be combined according to the FDX-B data structure to obtain target decoded data.

Specifically, after decoding each fragmented data, recombination can be performed using the FDX-B data organization form to finally obtain 8 bytes of identification code+2 bytes of CRC check code+3 bytes of extended data.

It can also be understood that the recombination process is actually as follows: combining sub-wavebands obtained from previous segmentation and decoding, and recombining them in an FDX-B format according to the order of the wavebands to obtain 8 bytes (64 bits) of identification code+2 bytes (16 bits) of CRC check code, the 8 bytes of identification code is the coding information of the ear tag.

In an embodiment, the determining target decoded data of the first signal according to the decoded data includes:

combining the decoded data to obtain first decoded data, according to the data structure of the first signal; checking the first decoded data; and determining the first decoded data as the target decoded data of the first signal if the checking is passed.

In the embodiment of the present disclosure, after the decoded data is combined to obtain the first decoded data, the first decoded data is further checked to see if it is valid data, and if the checking is passed, the first decoded data can be used as the target decoded data.

In summary, according to the embodiments of the present disclosure, a method and an apparatus for code reading of an ear tag are provided. It is found that when a reader is far away from the ear tag, the reason why the content of the ear tag cannot be accurately read is that when the distance is far, a signal in the ear tag acquired by the reader is greatly deformed, and the decoding of the deformed signal is prone to errors or failure in decoding. Therefore, in the embodiments of the present disclosure, a first signal from an ear tag can be acquired as an analog signal to obtain a second signal, and further the second signal that may be deformed is converted into a rectangular wave signal, fragmentation and compensation are performed on the rectangular wave signal according to a data structure, so as to obtain an accurate waveband, and after the compensated waveband is decoded and combined into target decoded data, accurate reading of the data can be realized. That is, in the embodiments of the present disclosure, even if a deformed signal is acquired, accurate target decoded data can still be restored based on conversion, fragmentation, and compensation, and in practice, comparing with a traditional way, it can be improved by about 40% in terms of distance.

Figure 13:
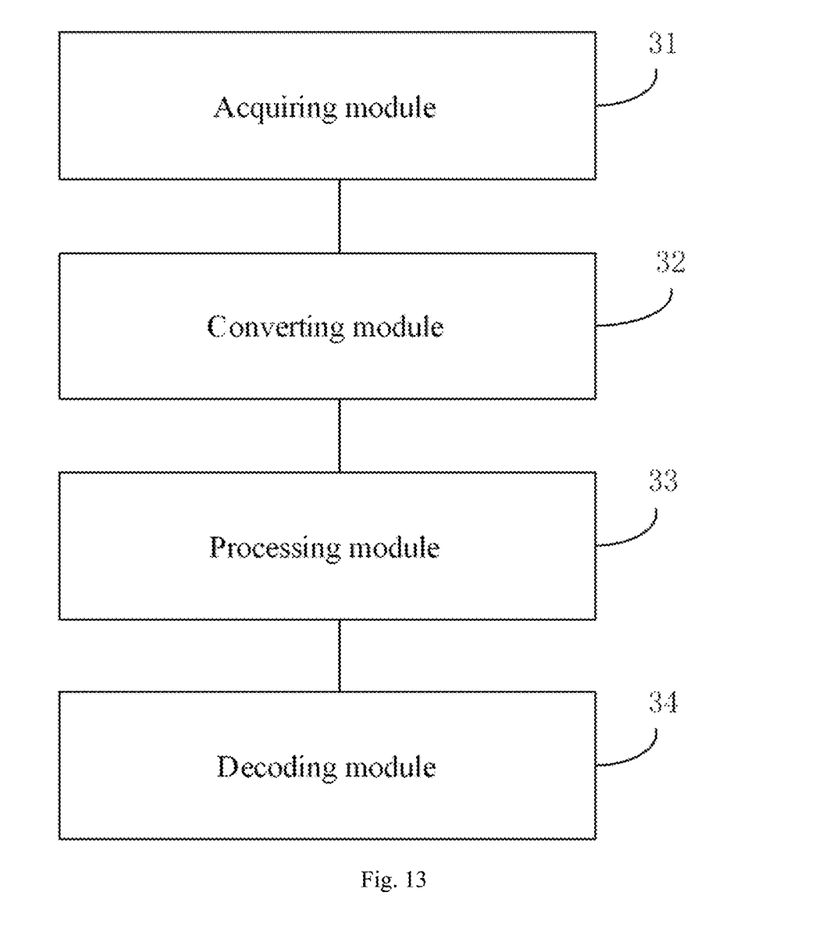
FIG. 13 is a schematic structural diagram of a data processing apparatus provided by the present disclosure.

FIG. 13 is a schematic structural diagram of an embodiment of a structure of an apparatus for code reading of an ear tag provided by the present disclosure. As shown in FIG. 13, the apparatus for code reading of the ear tag provided in the embodiment includes:

an acquiring module 31, configured to acquire a first signal from the ear tag according to an acquisition mode of an analog signal to obtain a second signal;

a converting module 32, configured to convert the second signal into a rectangular wave signal;

a processing module 33, configured to perform fragmentation and compensation on the rectangular wave signal to obtain multiple pieces of fragmented data, according to a data structure of the first signal and a time difference between adjacent falling edges and rising edges in the rectangular wave signal; and a decoding module 34, configured to decode the multiple pieces of fragmented data respectively, and determine target decoded data of the first signal according to the decoded data, where the target decoded data is obtained from combination in accordance with the data structure of the first signal.

In an embodiment, the converting module is specifically configured to:

perform a differential operation on the second signal to obtain peaks and valleys in the second signal;

segment the second signal according to the peaks and the valleys; and perform a logic conversion on a segmented waveform to obtain the rectangular wave signal.

In an embodiment, with respect to the segmenting of the second signal according to the peaks and the valleys, a segmenting point is a midpoint of adjacent peak and valley; and the converting module is further configured to:

convert a waveband including the peak to a high level, and convert a waveband including the valley to a low level.

In an embodiment, the processing module is specifically configured to:

crop or add to the rectangular wave signal to obtain multiple pieces of grouped data, according to the data structure of the first signal and the time difference between the adjacent falling edges and rising edges in the rectangular wave signal; and adjust the time difference between the adjacent falling edges and rising edges in the respective grouped data to a preset value that matches the time difference to obtain the multiple pieces of grouped data.

In an embodiment, the decoding module is specifically configured to:

combine the decoded data to obtain first decoded data, according to the data structure of the first signal;

check the first decoded data; and determine the first decoded data as the target decoded data of the first signal if the checking is passed.

In summary, according to the embodiments of the present disclosure, a method and an apparatus for code reading of an ear tag are provided. It is found that when a reader is far away from the ear tag, the reason why the content of the ear tag cannot be accurately read is that when the distance is far, a signal in the ear tag acquired by the reader is greatly deformed, and the decoding of the deformed signal is prone to errors or failure in decoding. Therefore, in the embodiments of the present disclosure, a first signal from an ear tag can be acquired as an analog signal to obtain a second signal, and further the second signal that may be deformed is converted into a rectangular wave signal, fragmentation and compensation are performed on the rectangular wave signal according to a data structure, so as to obtain an accurate waveband, and after the compensated waveband is decoded and combined into target decoded data, accurate reading of the data can be realized. That is, in the embodiments of the present disclosure, even if a deformed signal is acquired, accurate target decoded data can still be restored based on conversion, fragmentation, and compensation, and in practice, comparing with a traditional way, it can be improved by about 40% in terms of distance.

The apparatus for code reading of the ear tag provided by the embodiments of the present disclosure can be used to perform the method shown in each of the preceding corresponding embodiments, with the same implementation manners and principle which will not be repeated herein.

Embodiments of the present disclosure further provide an electronic device, including: a processor, a memory, and a computer program; where the computer program is stored in the memory and is configured to be executed by the processor, and the computer program includes instructions for executing the method as described in any one of the preceding embodiments.

Embodiments of the present disclosure further provide a computer-readable storage medium, where the computer-readable storage medium stores a computer program, and when the computer program is executed, the method as described in any one of the preceding embodiments is implemented.

It will be understood by those skilled in the art that all or some of the steps to implement each of the method embodiments described above can be accomplished by means of hardware associated with program instructions. The aforementioned program can be stored in a computer-readable storage medium. The program, when executed, performs the steps including each of the method embodiments described above; and the aforementioned storage medium includes: ROM, RAM, disk or CD-ROM, and various other media that can store program codes.

Finally, it should be noted that the above embodiments are merely intended for describing, rather than limiting, the technical solutions of the present application; although the present application has been described in detail with reference to the foregoing embodiments, those skilled in the art will understand that they may still make modifications to the technical solutions described in the foregoing embodiments, or make equivalent substitutions to some or all of the technical features therein; and the modifications or substitutions do not make the essence of the corresponding technical solutions deviate from the scope of the technical solutions in the embodiments of the present application.

What is claimed is:

1. A method for code reading of an ear tag, the method comprising:
sampling a first signal from the ear tag according to a sampling mode of an analog signal to obtain a second signal;
converting the second signal into a rectangular wave signal;
performing fragmentation and compensation on the rectangular wave signal to obtain multiple pieces of fragmented data, according to a data structure of the first signal and a time difference between adjacent falling edges and rising edges in the rectangular wave signal; and
decoding the multiple pieces of fragmented data respectively, and determining target decoded data of the first signal according to the decoded data, wherein the target decoded data is obtained from combination in accordance with the data structure of the first signal.

2. The method according to claim 1, wherein the converting the second signal into a rectangular wave signal comprises:
performing a differential operation on the second signal to obtain peaks and valleys in the second signal;
segmenting the second signal according to the peaks and the valleys; and
performing a logic conversion on a segmented waveform to obtain the rectangular wave signal.

3. The method according to claim 2, wherein with respect to the segmenting of the second signal according to the peaks and the valleys, a segmenting point is a midpoint of adjacent peak and valley; and
the performing a logical conversion on a segmented waveform comprises:
converting a waveband comprising the peak to a high level, and converting a waveband comprising the valley to a low level.

4. The method according to claim 1, wherein the performing fragmentation and compensation on the rectangular wave signal to obtain multiple pieces of fragmented data, according to a data structure of the first signal and a time difference between adjacent falling edges and rising edges in the rectangular wave signal comprises:
cropping or adding to the rectangular wave signal to obtain multiple pieces of grouped data, according to the data structure of the first signal and the time difference between the adjacent falling edges and rising edges in the rectangular wave signal; and
adjusting the time difference between the adjacent falling edges and rising edges in the respective grouped data to a preset value that matches the time difference to obtain the multiple pieces of fragmented data.

5. The method according to claim 2, wherein the performing fragmentation and compensation on the rectangular wave signal to obtain multiple pieces of fragmented data, according to a data structure of the first signal and a time difference between adjacent falling edges and rising edges in the rectangular wave signal comprises:
cropping or adding to the rectangular wave signal to obtain multiple pieces of grouped data, according to the data structure of the first signal and the time difference between the adjacent falling edges and rising edges in the rectangular wave signal; and
adjusting the time difference between the adjacent falling edges and rising edges in the respective grouped data to a preset value that matches the time difference to obtain the multiple pieces of fragmented data.

6. The method according to claim 3, wherein the performing fragmentation and compensation on the rectangular wave signal to obtain multiple pieces of fragmented data, according to a data structure of the first signal and a time difference between adjacent falling edges and rising edges in the rectangular wave signal comprises:
cropping or adding to the rectangular wave signal to obtain multiple pieces of grouped data, according to the data structure of the first signal and the time difference between the adjacent falling edges and rising edges in the rectangular wave signal; and
adjusting the time difference between the adjacent falling edges and rising edges in the respective grouped data to a preset value that matches the time difference to obtain the multiple pieces of fragmented data.

7. The method according to claim 1, wherein the determining target decoded data of the first signal according to the decoded data comprises:
combining the decoded data to obtain first decoded data, according to the data structure of the first signal;
checking the first decoded data; and
determining the first decoded data as the target decoded data of the first signal if the checking is passed.

8. The method according to claim 2, wherein the determining target decoded data of the first signal according to the decoded data comprises:
combining the decoded data to obtain first decoded data, according to the data structure of the first signal;
checking the first decoded data; and
determining the first decoded data as the target decoded data of the first signal if the checking is passed.

9. The method according to claim 3, wherein the determining target decoded data of the first signal according to the decoded data comprises:
combining the decoded data to obtain first decoded data, according to the data structure of the first signal;
checking the first decoded data; and
determining the first decoded data as the target decoded data of the first signal if the checking is passed.

10. An apparatus for code reading of an ear tag, the apparatus comprising:
a processor,
a memory, and
a computer program;
wherein the computer program is stored in the memory and is configured to be executed by the processor, and the computer program comprises instructions to enable the processor to:
sample a first signal from the ear tag according to a sampling mode of an analog signal to obtain a second signal;
convert the second signal into a rectangular wave signal;
perform fragmentation and compensation on the rectangular wave signal to obtain multiple pieces of fragmented data, according to a data structure of the first signal and a time difference between adjacent falling edges and rising edges in the rectangular wave signal; and decode the multiple pieces of fragmented data respectively, and determine target decoded data of the first signal according to the decoded data, wherein the target decoded data is obtained from combination in accordance with the data structure of the first signal.

11. The apparatus according to claim 10, wherein the processor is enabled to:
perform a differential operation on the second signal to obtain peaks and valleys in the second signal;
segment the second signal according to the peaks and the valleys; and
perform a logic conversion on a segmented waveform to obtain the rectangular wave signal.

12. The apparatus according to claim 11, wherein with respect to the segmenting of the second signal according to the peaks and the valleys, a segmenting point is a midpoint of adjacent peak and valley; and
the processor is further enabled to:
convert a waveband comprising the peak to a high level, and convert a waveband comprising the valley to a low level.

13. The apparatus according to claim 10, wherein the processor is enabled to:
crop or add to the rectangular wave signal to obtain multiple pieces of grouped data, according to the data structure of the first signal and the time difference between the adjacent falling edges and rising edges in the rectangular wave signal; and
adjust the time difference between the adjacent falling edges and rising edges in the respective grouped data to a preset value that matches the time difference to obtain the multiple pieces of fragmented data.

14. The apparatus according to claim 11, wherein the processor is enabled to:
crop or add to the rectangular wave signal to obtain multiple pieces of grouped data, according to the data structure of the first signal and the time difference between the adjacent falling edges and rising edges in the rectangular wave signal; and
adjust the time difference between the adjacent falling edges and rising edges in the respective grouped data to a preset value that matches the time difference to obtain the multiple pieces of fragmented data.

15. The apparatus according to claim 12, wherein the processor is enabled to:
crop or add to the rectangular wave signal to obtain multiple pieces of grouped data, according to the data structure of the first signal and the time difference between the adjacent falling edges and rising edges in the rectangular wave signal; and
adjust the time difference between the adjacent falling edges and rising edges in the respective grouped data to a preset value that matches the time difference to obtain the multiple pieces of fragmented data.

16. The apparatus according to claim 10, wherein the processor is enabled to:
combine the decoded data to obtain first decoded data, according to the data structure of the first signal;
check the first decoded data; and
determine the first decoded data as the target decoded data of the first signal if the checking is passed.

17. The apparatus according to claim 11, wherein the processor is enabled to:
combine the decoded data to obtain first decoded data, according to the data structure of the first signal;
check the first decoded data; and
determine the first decoded data as the target decoded data of the first signal if the checking is passed.

18. The apparatus according to claim 12, wherein the processor is enabled to:
combine the decoded data to obtain first decoded data, according to the data structure of the first signal;
check the first decoded data; and
determine the first decoded data as the target decoded data of the first signal if the checking is passed.

19. A computer-readable storage medium, wherein the computer-readable storage medium stores a computer program, and when the computer program is executed, the following steps are implemented:
sampling a first signal from the ear tag according to a sampling mode of an analog signal to obtain a second signal;
converting the second signal into a rectangular wave signal;
performing fragmentation and compensation on the rectangular wave signal to obtain multiple pieces of fragmented data, according to a data structure of the first signal and a time difference between adjacent falling edges and rising edges in the rectangular wave signal; and
decoding the multiple pieces of fragmented data respectively, and determining target decoded data of the first signal according to the decoded data, wherein the target decoded data is obtained from combination in accordance with the data structure of the first signal.

\* \* \* \* \*